(12) United States Patent
Contreras Villasmil

(10) Patent No.: US 11,730,164 B2
(45) Date of Patent: *Aug. 22, 2023

(54) TISSUE PRESERVATION

(71) Applicant: PHANTOMS BIOLOGICS RESEARCH LLC, Orlando, FL (US)

(72) Inventor: Clorinda V Contreras Villasmil, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,800

(22) Filed: May 16, 2022

(65) Prior Publication Data

US 2022/0361481 A1 Nov. 17, 2022

Related U.S. Application Data

(63) Continuation-in-part of application No. 17/321,454, filed on May 16, 2021, now Pat. No. 11,280,707.

(51) Int. Cl.
*G01N 1/30* (2006.01)
*A01N 1/02* (2006.01)

(52) U.S. Cl.
CPC ............. *A01N 1/0215* (2013.01); *G01N 1/30* (2013.01); *G01N 2001/307* (2013.01)

(58) Field of Classification Search
CPC ................................ G01N 1/30; A01N 1/0215
See application file for complete search history.

(56) References Cited

PUBLICATIONS

Pandey et al., International J of Pharmacy and Pharmaceutical Sciences, 2011, 3(1):234-237.*

* cited by examiner

*Primary Examiner* — Bin Shen
(74) *Attorney, Agent, or Firm* — Christopher J. Vandam, PA; Chris Van Dam

(57) ABSTRACT

A process for making and using a tissue preservation gel. The gel is comprised of water, reticulated acrylic acid, water soluble short-chain paraben, isopropyl alcohol and either triethanolamine or propylene glycol. To use the gel, a tissue to be preserved is first bathed in hypertonic sodium chloride, then soaked in a wash in multiple increasing concentrations of isopropyl alcohol and then preserved indefinitely in the tissue preservation gel.

2 Claims, 1 Drawing Sheet

| PRESENT INVENTION | PRIOR ART (FORMALDEHYDE) |
|---|---|
| BIODEGRADABLE | NOT BIODEGRADABLE |
| NON-TOXIC | TOXIC |
| NON-FLAMMABLE | FLAMMABLE |
| MINIMUM HUMAN RISK | HIGH HUMAN RISK |
| NOT DEHYDRATING | DEHYDRATING |
| NOT PATHOGENIC | PATHOGENIC |
| NO CANCER | CARCINOGENIC |
| CONSERVATION OF THE INTERNAL ENVIRONMENT | DAMAGE TO THE INTERNAL ENVIRONMENT |
| DOES NOT PRODUCE GASES | PRODUCES IRRITATING GASES |
| MAINTAINS PHYSIOLOGICAL CHARACTERISTICS OF SAMPLE | LOSS OF PHYSIOLOGICAL CHARACTERISTICS OF THE SAMPLE |

TISSUE PRESERVATION

RELATED APPLICATIONS

This application is a CIP of of Ser. No. 17/321,454 (filed May 16, 2021) PN 11280707.

TECHNICAL FIELD

The present invention relates to preserving biological tissue, and more particularly, to a formula and process for preserving biological samples for scientific and medical study.

BACKGROUND OF THE INVENTION

Several designs for tissue preservation formulas have been designed in the past. None of them, however, is non-toxic, non-flammable, non-carcinogenic, biodegradable while retaining performance to indefinitely preserve biological tissue without significant degradation of the tissue for later visual micro-analysis.

Applicant believes that the closest references correspond to commercially available formaldehyde based products. Each of these, by nature of having formaldehyde, is potentially dangerous to those using the products and affects the tissues being preserved negatively so that visual analysis cannot be confidently performed.

Other patents describing the closest subject matter provide for a number of more or less complicated features that fail to solve the problem in an efficient and economical way. None of these patents suggest the novel features of the present invention.

A brief abstract of the technical disclosure in the specification and title are provided as well for the purposes of complying with 37 CFR 1.72 and are not intended to be used for interpreting or limiting the scope of the claims.

Without limiting the scope of the invention, a brief summary of some of the claimed embodiments of the invention is set forth below. Additional details of the summarized embodiments of the invention and/or additional embodiments of the invention may be found in the detailed description of the invention below.

SUMMARY OF THE INVENTION

It is one of the main object of the present invention to provide a formulation directed to the preservation and conservation of biological tissue samples.

Another object of this invention is to provide a preservation solution with the viscosity and impedance calculated to allow the biological samples to be analyzed by diagnostic imaging, such as by microscope, MRI or TAC.

It is another object of the present invention to increase the weight of the solution part and container complex.

Another object of the present invention is to provide a solution that allows management of the specific weight of the of the part to be submitted to phantomization.

Another object of the present invention is to provide a long-term preservation and maintenance solution that is non-toxic, biodegradable, non-flammable, thermally stable and with a jelling or freezing point at approximately 20° C.

It is yet another object of this invention to provide such a formula and method of use that is inexpensive to manufacture and maintain while retaining its effectiveness.

Further objects of the invention will be brought out in the following part of the specification, wherein detailed description is for the purpose of fully disclosing the invention without placing limitations thereon.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

DESCRIPTION OF THE DRAWINGS

With the above and other related objects in view, the invention exists in the details of construction and combination of parts as will be more fully understood from the following description, when read in conjunction with the accompanying drawings in which:

FIG. 1 shows a chart of the advantages of the present formula over that of the prior art.

DETAILED DESCRIPTION

While this invention may be embodied in many different forms, there are described in detail herein specific embodiments of the invention. This description is exemplary of the principles of the invention and is not intended to limit the invention to the particular embodiments illustrated and described.

For the purpose of this disclosure, like reference numerals in the FIGURES shall refer to like features unless otherwise indicated or is obvious by context.

The subject formulation and method of use is sometimes referred to as the device, the invention, the preservation solution, the formula, the gel, the liquid, the preparation or other similar terms. These terms may be used interchangeably as context requires and from use the intent becomes apparent. The masculine can sometimes refer to the feminine and neuter and vice versa. The plural may include the singular and singular the plural as appropriate from a fair and reasonable interpretation in the situation.

Generally, the formula of the solution is aimed at the preservation and conservation of biological tissues. It has a viscosity and impedance calculated to allow the pieces to be analyzed by a traditional diagnostic imaging methods, such as microscope, medical ultrasound, TAC or MRI.

Preservation generally refers to protecting and caring for the integrity of a tissue sample from the moment it is received and intended to be subjected to the present process. Conservation generally has to do with the steps to which the sample is subjected so that it remains in good condition over time. And in this method these two characteristics are maintained through time indefinitely.

The formulation comprises to primary phases in the preparation. First, is histological fixation. In this phase the tissue from the sample is immersed in the fixative solution for a period of no less than 24 hours. Then the usual and known histological fixation process is continued to achieve the histological cuts where the fixative will be the present preservation gel. Then, the conservation phase of the anatomical pieces continue.

In a preferred method to achieve the histological fixation of the tissue, there are four steps. First, is fixing. A universal fixator that has been effective in testing is commercially available Formol™. Other commercially available geling agents may also be effective. From the moment of exeresis of the anatomic piece or organ, it is immersed in a volume of the preservative gel of a volume approximately 5 to 10 times the volume of the anatomic piece being fixed. The anatomic piece remains in the preserving gel no less than 24 hours to complete the fixing process.

Gelification is fairly described as the process of transformation of a sampled substance into a gelatine form. Because of this process the sampled substance, including their liquid components, become solid with the help of a geling agent.

The next phase is inclusion. Here, the tissue is subject to dehydration given by alcohols of increasing percentage concentrations. The last bath will be the preserving gel in a container capsule or grid. The inclusion process is performed so that the tissue to be studied achieves the necessary rigidity an adequate dehydration so that the tissue sample may be associated with the paraffin block.

Third, is the cut phase. Once the paraffin block is achieved the tissue is cut with a microtome. The cut is then mounted on the sheets.

The fourth step in the process is staining. In this step the tissue is ready to be stained with commercially available stains such as Ematocillin™ or Eosin™. The selection of the stain may be based on the basic or alkaline chemical affinity. It is through this process the sheet containing the tissue to be study is ready to be visualized through traditional microscopy means. In general, histological staining agents are used to provide contrast in tissue sections to aid in microscopic analysis.

Conservation Process of Anatomical Parts

The following is an example of a typical process for the conservation of anatomical pieces for forensic or educational purposes. For either purpose, the preservation of parts or whole organisms is done under the process of severe general dehydration of all the systems of which it is comprised. Known substances are used which the main effect is dehydration and also agents that prevent the over-production of bacteria and fungi to avoid the consequent putrefaction and fermentation of the tissue.

The present preservation formula is provided under the format of constant immersion of the biological part to be preserved. It is essential to avoid contact with common air and its subsequent oxidation. Together with this, it is intended with this immersion environment to control factors that also affect the parts such as the maceration or degradation of the internal environment has been widely demonstrated with pieces exposed and stored in glass containers for a long time. In these processes the penetration of Formalin™ (or other formaldehyde base solutions) are already known to penetrate about 0.5 mm per hour. It then reaches its maximum expression, consuming and disintegrating organs and systems of the biological pieces, making it not be optimal for future dissections.

The following describes an example of the process for conservation of anatomical samples comprised of two primary steps:

First is the washing and permeabilization phase. This is comprised of immersing the piece in about a 0.9% hypertonic sodium chloride solution. The volume guideline for amount of this solution is about that of the tissue piece multiplied by about ten times. This result gives the approximate volume of the 0.9% hypertonic sodium chloride solution that will be prepared for the washing. In most cases, previous exsanguination and lavage of excretory tracts has been completed.

The second phase is immersion in the presently disclosed tissue preservation formula. Using the same sample volume calculation guideline as for the permeabilization phase, the volume of the preservation fluid needed is calculated. The tissue sample is immersed in and sealed in its container with as little air as possible to reduce the potential degradation effects of oxygen and other contamination.

Example of the Preservation Fluid Formula and Process of Manufacture 1. 1000 mL Distilled water
2. 5 g Carbopol 940™ (a standardized polymer of acrylic acid cross-linked with a polyfunctional compound, hence, a poly (acrylic acid), polyacrylate or reticulated acrylic acid and it's derivatives)
   (a) Alternatively 5 g reticulated acrylic acid and it's derivatives
3. 1 mL triethanolamine (98-99% pure)
   (a) Alternatively 1 mL propylene glycol USP/EP may be substituted
4. 650 mL Isopropyl alcohol (100%)
5. 10 mL glycerin
6. 1 g Nipagin M™ (a standardized water soluble short-chain paraben)
   (a) Alternatively 1 g sodium benzoate may be substituted
7. Optionally, 0.5 mL blue dye
8. Optionally, 5 mL fragrance To prepare the tissue preservation liquid: In a 500 cc cylinder, place 350 cc of distilled water. Then, 5 g of Carbopol™ (a standardized polymer of acrylic acid cross-linked with a polyfunctional compound, hence, a poly (acrylic acid), polyacrylate or reticulated acrylic acid and it's derivatives) and 1 g of Nipagin™ (a standardized water soluble short-chain paraben) areadded to the water. With a glass stirrer, mix vigorously. Then the mouth of the cylinder is covered with control paper for twenty four hours. It should be appreciated that Nipagin™ is a trade name for a standardized water soluble short-chain paraben, for example, a methylparaben. It should be appreciated that Carbopol™ is a trade name for a standardized polymer of acrylic acid cross-linked with a polyfunctional compound, hence, a poly (acrylic acid), polyacrylate or reticulated acrylic acid and it's derivatives.

This makes up the hydration phase. After 24 hours a change in the color of the distilled water will be observed from colorless to whitish and a slight increase in its viscosity.

In phase two, an industrial mixer with a capacity greater than 4 liters is used. The mixture obtained from the hydration phase of the solutes is poured. Then, 650 mL of absolute alcohol (100%) is added. The combination is mixed for ten minutes observing the vortex of the mixture which will be inversely proportional to the viscosity. After ten minutes of mixing, 10 mL of glycerin, 0.5 mL of colorant and 5 mL of fragrance are added. The alcoholic degree is measured, to be confirmed it is within the range of 90 to 100% before proceeding with the next phase.

The third phase is neutralization. 1 mL of triethanolamine is added while continuing to agitate the mixture. A change in coloration will be observed again that depending on whether the vegetable coloring is used. Transparent blue should be observed which indicates that the properly gelled solution. Its viscosity is then verified to be within the range of between 2000 to 2500 centipoints.

Another Example of Ingredients of the Preservation Liquid/Gel

The following describes an example of manufacturing the preservation gel/liquid in a batch with these components:
1. DISTILLED WATER 3508 mL 2. CARBOPOL™ (a standardized polymer of acrylic acid cross-linked with a polyfunctional compound, hence, a poly (acrylic acid), polyacrylate or reticulated acrylic acid and it's derivatives) 160 grams
3. TRIETHYLENE GLYCOL 80 grams
4. NIPASOL™ NIPAGIN™ (a standardized water soluble short-chain paraben) 0.4 grams.
5. TRIETHANOLAMINE 0.33 Grams
6. VEGETABLE COLORING 1.5 cc
7. ESSENTIAL AROMATICS 30 cc
8. 70% ISOPROPYL ALCOHOL 1000 mL The preparation process of this variation of the formula is similar to that disclosed in the other examples described above.

Example: Conservation Process of Anatomical Parts

The following is an example of a typical process for the conservation of anatomical pieces for forensic or educational purposes. For either purpose, the preservation of parts or whole organisms is done under the process of severe general dehydration of all the systems of which it is comprised. Known substances are used which the main effect is dehydration and also agents that prevent the over-production of bacteria and fungi to avoid the consequent putrefaction and fermentation of the tissue.

The present preservation formula is provided under the format of constant immersion of the biological part to be preserved. It is essential to avoid contact with common air and its subsequent oxidation.

It is intended with this immersion environment to control factors that also affect the parts such as the maceration or degradation of the internal environment has been widely demonstrated with pieces exposed and stored in glass containers for a long time. In these processes the penetration of Formalin™ (or other formaldehyde base solutions) are already known to penetrate about 0.5 mm per hour. It then reaches its maximum expression, consuming and damaging organs and systems of the biological pieces, making it less than optimal for future dissections.

The viscosity of the tissue preservation gel for constant immersion can be adjusted to allow management of the specific weight of the part. The density can be adjusted from a low viscous fluid to a gelatinous medium. Adjusting for neutral buoyancy preserves the anatomy and integrity of the tissue.

Tissue preservation gel maintains the acoustic characteristics of the specimen, which allows for ultrasound studies, as well as radiology, tomography and magnetic resonance imaging (MRI). This allows the creation of an opto-acoustic capsule, with the anatomical specimens preserved, to be used for the training of health professionals, as well as for the constitution of anatomical museums.

Alternatively, the gel density achieves the necessary rigidity an adequate dehydration so that the tissue sample may be cut with a microtome and then mounted on glass slides for microscopic observation.

The formula also enhances the absorption of commercially available stains, improving the visualization of histological sections.

The following describes an example of the process for conservation of anatomical samples comprised of two primary steps:

First, washing and permeabilization phase. This is comprised of immersing the piece in about a 0.9% hypertonic sodium chloride solution. The volume guideline for amount of this solution is about that of the tissue piece multiplied by about ten times. This result gives the approximate volume of the 0.9% hypertonic sodium chloride solution that will be prepared for the washing. In most cases, previous exsanguination and lavage of excretory tracts has been completed.

The second phase is immersion in the presently disclosed tissue preservation formula. Using the same sample volume calculation guideline as for the permeabilization phase, the volume of the preservation fluid needed is calculated. The tissue sample is immersed in and sealed in its container with as little air as possible to reduce the potential degradation effects of oxygen and other contamination.

Example of the Preservation Fluid Formula and Process of Manufacture

Detailed below is a sample embodiment of the invention for about 2273.05 ml (½ gallon) gel:
1. 1000 mL Distilled water
2. 5 g Carbopol 940 ™ (a standardized polymer of acrylic acid cross-linked with a polyfunctional compound, hence, a poly (acrylic acid), polyacrylate or reticulated acrylic acid and it's derivatives)
    (a) Alternatively 5 g reticulated acrylic acid and its derivatives
3. 1 mL triethanolamine (98-99% pure)
    (a) Alternatively 1 mL propylene glycol USP/EP may be substituted
4. 650 mL Isopropyl alcohol (100%)
5. 10 mL glycerin
    (a) Alternatively 10 mL polyethylene glycol (PEG) or polypropylene glycol (PPG) may be substituted
6. 1 g Nipagin M™ (a standardized water soluble short-chain paraben)
    (a) Alternatively 1 g sodium benzoate may be substituted
7. Optionally, 0.5 mL blue dye
8. Optionally, 5 mL fragrance It should be appreciated that any formula provided herein is scaleable for greater or less quantities. The volumes and measure in the formulae are exemplary and represent a common batch quantity.

To prepare the tissue preservation liquid:

In a 500 cc cylinder, place 350 cc of distilled water. Then, 5 g of Carbopol™ (a standardized polymer of acrylic acid cross-linked with a polyfunctional compound, hence, a poly (acrylic acid), polyacrylate or reticulated acrylic acid and it's derivatives) and 1 g of Nipagin™ (a standardized water soluble short-chain paraben) are added to the water. With a glass stirrer, mix vigorously. Then, the mouth of the cylinder is covered with control paper for twenty-four hours.

It should be appreciated that Nipagin™ is a trade name for a standardized water soluble short-chain paraben, for example, a methylparaben. It should be appreciated that Carbopol™ is a trade name for a standardized polymer of acrylic acid cross-linked with a polyfunctional compound, hence, a poly (acrylic acid), polyacrylate or reticulated acrylic acid and it's derivatives.

This makes up the hydration phase. After twenty four hours a change in the color of the solution will be observed from colorless to whitish and a slight increase in its viscosity.

In phase two, an industrial mixer with a capacity greater than 4 liters is used. The mixture obtained from the hydration phase of the solutes is poured. Then, 650 mL of absolute alcohol (100%) is added. The combination is mixed for about ten minutes, observing the vortex of the mixture which will be inversely proportional to the viscosity. After ten minutes of mixing, 10 mL of glycerin, 0.5 mL of colorant and 5 mL of fragrance are added. The alcoholic degree is measured, to be confirmed it is within the range of 90 to 100% before proceeding with the next phase.

The third phase is neutralization. 1 mL of triethanolamine is added while continuing to agitate the mixture. A change in coloration may be observed, depending on whether the vegetable coloring is used. Transparent blue should be observed which indicates that the properly gelled solution. Its viscosity is then verified to be within the range of between 2000 to 2500 centipoints, and if not make adjustments to ensure this viscosity.

Another Example of Ingredients of the Preservation Liquid/Gel

The following describes sample embodiment of manufacturing the preservation gel/liquid in a batch with these components:
1. Distilled water 3508 ml
Carbopol™ 160 grams
3. Triethylene glycol 80 grams
4. Nipasoltm/nipagintm 0.4 grams.
5. Triethanolamine 0.33 Grams
6. Vegetable coloring 1.5 cc
7. Essential aromatics 30 cc
8. 70% isopropyl alcohol 1000 ml The preparation process of this variation of the formula similar to that disclosed in the other example described above.

An important version of the process can be fairly described as a process for making a tissue preservation gel resulting from the ration resulting from the following components and comprised of the steps:

Combining and mixing in a vessel 350 mL distilled water, 5 g of a reticulated acrylic acid, or similar gelling agent, and 1 g of a water soluble short-chain paraben. Then, sealing the vessel and waiting at least 24 hours for these components to combine. Then, adding to the vessel 650 mL isopropyl alcohol and mixing together in the vessel for at least 10 minutes.

Then, adding and mixing to the vessel 10 mL glycerin. Then, measuring the alcoholic degree of the contents of the vessel and proceeding only when the alcoholic degree is within 90% to 100% or making adjustments to the mixture to ensure it is in this range. Then, adding by mixing into the vessel 1 mL total of at least one of triethanolamine or propylene glycol and measuring a viscosity of the contents of the vessel.

Optionally, the process may be characterized in that the water soluble short-chain paraben is Nipagin™. Optionally, the reticulated acrylic is Carbapol™. Optionally, with the glycerin is included about 0.5 mL colorant. Optionally, with the glycerin is included about 5 mL fragrance, for example an essential oil.

This use of the formula, for example, is fairly described as a process for preserving a tissue comprised of the steps:

Submersing for at least twenty four hours the tissue to be preserved in a vessel containing a solution of about 0.9% hypertonic sodium chloride where a volume of the solution is at least 5 times, to about 10 times greater than the volume of the tissue. Then, replacing the gel with a first concentration of isopropyl alcohol and submerging the tissue. Then, replacing the first concentration of isopropyl alcohol with a second greater concentration of isopropyl alcohol and submersing the tissue. Then, retaining the tissue in the second greater concentration of isopropyl alcohol until the tissue achieves a paraffin stage. Then, submersing the tissue in a vessel containing the gel in claim 1. Then, adjusting the viscosity for the inclusion process.

The inclusion process is performed so that the tissue to be studied achieves the necessary rigidity and adequate dehydration so that the tissue sample may be cut with a microtome. The cut is then mounted on glass slides, ready to be stained with histological staining agents and visualized through traditional microscopy means.

The biological sample can also be analyzed via immunohistochemistry (IHC) or immunocytochemistry (ICC). IHC is performed on samples derived from tissues that have been histologically processed into thin sections and the staining process exploits antibodies that deposit a colored staining product at antigenic sites within the sample. ICC relies on the same antigen-antibody reactions as IHC, but it is performed on samples consisting of cells grown in a monolayer which are deposited on a slide.

It should be appreciated that the claims disclose a specific formula of a preservation gel that is described in specific volumes of constituent ingredients. The process of making the preservation gels should be understood as a scaleable process where more or less of the preservation gel could be made or used, consistent within the framework of its claimed application and use. The claimed specific volume may be to great or too little, depending on the side of the biological sample being preserved. The claim process for the preservation should be interpreted as a proportional guide to scale up or down the volume of preservation gel consistent with the exemplary formulas in the claims. For example, claim 2 as originally filed demonstrates a formula for about a half gallon or 2273.05 mL. More or less than a half gallon may be required to comply with the balance of the claimed process and is not intended to be limiting. In other words, the formula in the claim could be scaled up or down if more or less of the preservation gel is needed for a give tissue sample.

An important version of the process can be fairly described as a process for making a tissue preservation gel resulting from the ration resulting from the following components and comprised of the steps: combining and mixing in a vessel 350 mL distilled water, 5 g of a reticulated acrylic acid, or similar gelling agent and 1 g of a water soluble short-chain paraben. Then, sealing the vessel and waiting at least 24 hours for these components to combine. Then, adding to the vessel 650 mL isopropyl alcohol and mixing together in the vessel for at least 10 minutes. Then, adding and mixing to the vessel 10 mL glycerin. Then, measuring the alcoholic degree of the contents of the vessel and proceeding only when the alcoholic degree is within 90% to 100% or making adjustments to the mixture to ensure it is in this range. Then, adding by mixing into the vessel 1 mL total of at least one of triethanolamine or propylene glycol; measuring a viscosity of the contents of the vessel. Then, determining that the tissue preservation gel is correct only if the viscosity is between 2000 to 2500 centipoints, and if not make adjustments to ensure this viscosity. Optionally, the process may be characterized in that the water soluble short-chain paraben is Nipagin™. Optionally, the reticulated acrylic acid is Carbapol™. Optionally, with the glycerin is included about 0.5 mL colorant. Optionally, with the glycerin is included about 5 mL fragrance, for example an essential oil. This formula includes it use that is fairly described as a process for preserving a tissue comprised of the steps: submersing for at least 24 hours the tissue to be preserved in a vessel containing a solution of about 0.9% hypertonic sodium chloride where a volume of the solution is at least 5 times, to about 10 times greater than a volume of the tissue. Then, replacing the gel with a first concentration of isopropyl alcohol and submerging the tissue. Then, replacing the first concentration of isopropyl alcohol with a second greater concentration of isopropyl alcohol and submersing the tissue. Then, retaining the tissue in the second greater concentration of isopropyl alcohol until the tissue achieves a paraffin stage. Then, submersing the tissue in a vessel containing the gel in claim 1.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

INDUSTRIAL APPLICABILITY

It is evident that the tissue preservation invention has industrial applicability in that it allows the long term preservation and study of biological tissue samples. The samples are preserved in a format more closely matching a natural state and therefore may be examined accurately. The invention also saves money, time and resources by the longevity and durability of the preserved tissue.

What is claimed is:

1. A process for preserving a tissue comprised of the steps:
submersing for at least 24 hours the tissue in a first vessel containing a first solution of 0.9% hypertonic sodium chloride where a volume of the first solution is at least 5 times greater than a volume of the tissue;
replacing the first solution with a first concentration of isopropyl alcohol and submerging the tissue;
replacing the first concentration of isopropyl alcohol with a second greater concentration of isopropyl alcohol and submersing the tissue;
retaining the tissue in the second greater concentration of isopropyl alcohol until the tissue achieves a paraffin stage;
then, in a second vessel preparing a preservation gel in a scalable ratio by:
a) combining and mixing in the second vessel 350 mL distilled water, 5 g of a reticulated acrylic acid and 1 g of a water soluble short-chain paraben;
b) sealing the vessel and waiting at least 24 hours;
c) adding to the vessel 650 mL isopropyl alcohol with an alcoholic degree between 90% to 100%;
d) mixing the contents of the vessel for at least 10 minutes;
e) adding and mixing to the vessel 10 mL glycerin;
f) adding and mixing into the vessel 1 mL total of at least one of triethanolamine or propylene glycol;
g) measuring a viscosity of the contents of the vessel; and
h) selecting the contents of the second vessel as the preservation gel with the viscosity between 2000 to 2500 centipoints;
i) submersing the tissue in the preservation gel.
2. A process for preserving a tissue comprised of the steps:
submersing for at least 24 hours the tissue in a first vessel containing a first solution of 0.9% hypertonic sodium chloride where a volume of the first solution is at least 5 times greater than a volume of the tissue;
replacing the first solution with a first concentration of isopropyl alcohol and submerging the tissue;
replacing the first concentration of isopropyl alcohol with a second greater concentration of isopropyl alcohol and submersing the tissue;
retaining the tissue in the second greater concentration of isopropyl alcohol until the tissue achieves a paraffin stage;
then, in a second vessel preparing a preservation gel in a scalable amount for a proportionate ratio totaling of 2273.05 mL by:
a) combining and mixing in the second vessel: 1250 mL distilled water and at least 50 g of reticulated acrylic acid and at least 0.2 g of a water soluble short-chain paraben;
b) sealing the second vessel and waiting at least 24 hours;
c) adding to the second vessel at least 1000 mL of a miscible antiseptic, selected from the group consisting of isopropyl alcohol, ethanol with an alcoholic degree between 90% to 100%;
d) mixing the contents of the second vessel for at least 10 minutes;
e) adding to the second vessel and mixing at least 10 mL of a low molecular weight polyol selected from: glycerin, polyethylene glycol (PEG) and polypropylene glycol (PPG);
f) adding and mixing into the second vessel at least 1 mL total of at least one of triethanolamine or propylene glycol;
g) adjusting the viscosity of the preservation gel to a specific weight of neutral buoyancy and a viscosity between 2000 to 2500 centipoints, thereby obtaining the preservation gel;
then submersing the tissue in the preservation gel.

* * * * *